6163X
S. Slater.
Thrashing Mach.
Patented Oct. 1, 1830.
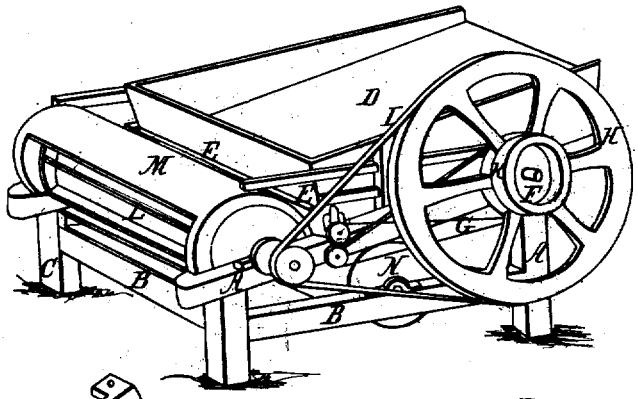
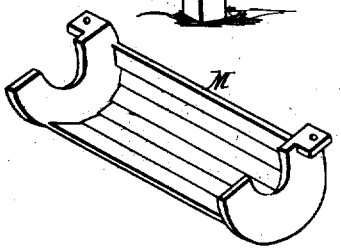
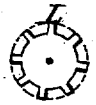
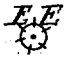
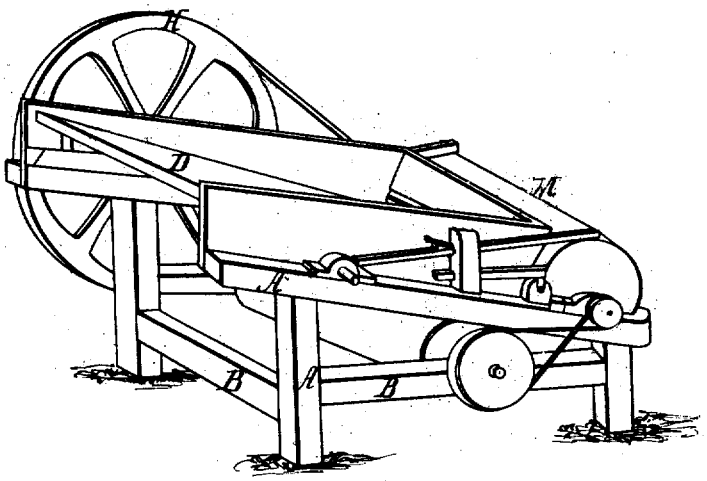

Oct 1 1830 6163X 231.

Samuel Slater, Northern Liberties, Philad.a Pa.

Letters Pattent.

The Schedule referred to in these Letters Patent, and making part of the same, containing a description in the words of the said Samuel Slater himself of his improvement in the machine called Slater's Threshing and Winnowing Machine.

To all persons to whom these presents shall come. I Samuel Slater of the Northern Liberties in the County of Philadelphia, State of Pennsylvania, Artist, send greeting. Be it known that I Samuel Slater have invented, discovered, and applied to use, several new and highly useful improvements in a Machine called & known as Slaters Threshing and Winnowing Machine, for the purpose of [illegible] Threshing and cleaning all kinds of small grain, and particularly that of rice; A fan is connected with the machinery, that completely separates the straw and chaff from the grain at the same operation. It has also the desirable effect of expelling the dust from the person who attends the Machine; without that improvement the dust would be a great inconvenience to the operator, which has from practical [illegible] experiment been pronounced superior to any Machine, heretofore known or invented. AA, the frame, made of scantling of either hard or soft wood, or of metal, if of wood scantling five inches square iron in proportion, about six feet in length, and from two to three in width; the frame standing in the front two feet six inches in height, in the rear about four feet which gives it the position of an inclined plane; the above is calculated for a beater twenty seven inches in length which will be hereafter described. B.B. The girths and Joint bolts near the bottom, running from the back to the front posts on each side, and from one back post to the other; in front is a girth within ten [illegible] inches of the top, extending across the corresponding front posts, which are secured by Joint bolts, on which rests the mouth of the Drawing.

the fan. C. The front posts, are about eighteen inches shorter
than the rear posts which are about four feet in height. D. the
inclined plane or flooring for the grain in the straw by which
it is conducted to the feeding rolls, is made of pine or other
boards worked smooth, of sufficient length to contain the
longest sheaf of grain in the box, which is represented in the
cut E.E. The feeding rolls, are constructed of wood or iron,
if made of wood and iron it is necessary to have a wooden
cylinder about three inches in diameter, fluted out in eight
or ten places or more, half an inch in depth to receive pieces
of common hoop iron set in edgeways, leaving it projecting
out one fourth of an inch which will conduct the sheaves
to the beater. The feeding rolls have a shaft or gudgeons pass
-ing through the ends and extending across the frame, of
sufficient length to admit the bearings and pulleys; the said
pulleys are about four inches in diameter and grooved on the
edge to admit a round band that connects with the drawing
pulleys on the main wheel shaft. F. The main balance wheel
shaft, one and three quarter inch in diameter, extending across
the frame of the machine twelve inches clear on the left hand
side, which is turned with bearings, secured by boxes and caps bolted
to the frame. The caps to the said boxes have a cup or cavity which
will contain about half a gill of oil, and a weeper at the bottom which
gradually falls upon the gudgeons, the moisture of which is a complete
preventative from heat or friction. G. The pulleys on the projecting
shaft, nine inches in diameter, turned with grooves and connected
with bands to drive the feeding rolls, which can be increased in
size to give any required speed. H. The balance wheel about
six feet in diameter connected with the aforesaid driving pulleys
on the before mentioned projecting shaft; the necessary weight
of the wheel is about two hundred pounds, the design of this
is to keep the momentum of the beater up, which will prevent
the straw from checking the velocity of the beater, which is
at all important in threshing the grain and cleaning it, in a man
ner not heretofore known or done by any Machinery.
I. The belt which around the main wheel that drives the whirl
or pulley attached to the beater. See cut. It may also be constructed
with a bevel to conform with the figure or hieroglyphic, thus ⌐,
which will prevent the band from passing off the wheel, or running
at random; the band must pass two or three times round the wheel
extending to the whirl, in a like manner on the shaft of the beater
there to be placed two or three times round it to prevent it from
slipping. K. A pulley attached to the main balance wheel eighteen
inches in diameter and may be used with either belt or band
leading to the horse power; which may be constructed in the same
manner as the aforementioned balance wheel. L. The beater or
cylinder, is twenty seven inches in length, constructed with a
shaft about one and three quarters of an inch in diameter
made of iron turned with bearings and projecting over both
sides for the reception of the driving pulleys, which are secured
to the frame by boxes and caps as explained under the letter F.
The beater is about ten or twelve inches from the front of the frame
the beater or cylinder is made of wood eight inches in diameter ten
inches including the beaters which are iron set in grooves of half
an inch, which have tenons on each end, on which is a head of
wrought or cast iron with mortises to receive them, - this is the
head of the cylinder, "See cut; the said beater which is in front
of the feeding rolls also in the front part of the machine beats
the grain upwards against the concave, while the fan or
cleaning Machine acts beneath. M. The concave, is a cylinder
of cast iron, which covers about one third of the beater, with grooves
on the inside which act as a rubber against the beater; the concave
rests on the frame, has heads at each end, it comes in contact or
within the eighth part of an inch of the beater secured by wooden
springs resting on the top. See Cut; - there is also a projecting ear
or piece of iron, one and a half inch on each end of the concave
which

6163X which is or may be secured by a bolt passing through a spiral spring and secured on the under side with a nut, which is a substitute or improvement for the wooden springs before mentioned. These springs are very material; they give the machinery easy and even operation, rising and passing suitable to the quantity of grain in the feeder. N. The fan before mentioned is connected with the machine secured to the frame under the floor or apron; The fan is constructed with a shaft made of iron passing through the cylinder or covering of the fan and projecting over on the right hand side to receive a pulley of a size calculated to reduce the velocity to that of one fourth of the beater; The cylinder is a concave plan the air passes in at the head, and is conducted by the motion of the fans or wings in the beater to the under side, where the grain passes out. Sec but,. Recapitulation. The frame for a beater twenty seven inches in length, eight in diameter, making making ten inches including the iron beaters; The frame is also twenty seven inches in width in the clear, six or eight feet in length, the rear or back posts about four feet high, the front posts about thirty inches, the front and back posts about five feet apart. the floor inclining to give the grain a free and easy pitch to the feeding rolls to pass it to the beater; The beater may be propelled to the velocity of from sixteen hundred to two thousand revolutions in a minute, it is a quick lively blow that threshes the grain clean, there are six beaters which strike the grain from nine to twelve thousand times a minute. a fan constructed on the inside, with a conductor on the under side of the beater to separate and clean the grain from the straw as it drops from the beater; a concave that covers the beater about a third of a circle, kept in its place by bolts and springs. It also has a horse power of the usual construction. The difference between the plan and operation of this Threshing and winnowing or cleaning machine, consists in this, that is to say: in the first place, the machine is constructed with a board flooring instead of a cloth apron which is is now used; the board flooring answers the purpose much
better than the revolving apron, and is at the same time less
expensive and not liable to want repairing, or being injured.
2nd, The beater revolving or throwing the dust from the person
attending the Machine, which is not the case in any former inven=
tion. _ 3rd, the simplicity of the concave. 4th, The Fan, the wind
coming in contact with the beater, which prevents the straw
from tangling round the beater and separating the grain from
the straw. _ 5th, The whole Machine is more simple and more
precise in its operations, much better calculated for the farmer
than any now in use, durable and easily constructed, the price
considerably less than others, which afford no competition with
the above described. 6th, The machine is also admirably
calculated for threshing rice. The claims are the general
merits of the machine. In testimony that the foregoing
is a true specification of my said Machine, as above described
I have hereunto set my hand and seal, at Philadelphia in the State
of Pennsylvania, this third day of July in the year of our Lord, one
one thousand eight hundred and thirty; 1830.

Witnesses
Jn°. Weaver
Isaac Koons
Philip [illegible]

Samuel Slater

E. L.
Ck [illegible]

1771 [illegible]